(12) United States Patent
Kanou et al.

(10) Patent No.: US 7,863,358 B2
(45) Date of Patent: Jan. 4, 2011

(54) 2-CYANOACRYLATE COMPOSITION

(75) Inventors: Muneaki Kanou, Aichi (JP); Yoshiharu Ohashi, Aichi (JP)

(73) Assignee: Toagosei Co., Ltd., Tokyo (JP)

( * ) Notice: Subject to any disclaimer, the term of this patent is extended or adjusted under 35 U.S.C. 154(b) by 0 days.

(21) Appl. No.: 11/918,167

(22) PCT Filed: May 29, 2006

(86) PCT No.: PCT/JP2006/310622

§ 371 (c)(1),
(2), (4) Date: Oct. 10, 2007

(87) PCT Pub. No.: WO2006/129580

PCT Pub. Date: Dec. 7, 2006

(65) Prior Publication Data

US 2009/0050019 A1 Feb. 26, 2009

(30) Foreign Application Priority Data

May 30, 2005 (JP) .............................. 2005-156636

(51) Int. Cl.
C08K 5/06 (2006.01)
C08K 5/13 (2006.01)
C08K 5/159 (2006.01)

(52) U.S. Cl. ........................... 524/108; 52/324; 52/366; 52/367

(58) Field of Classification Search ................. 524/324, 524/366, 367, 108
See application file for complete search history.

(56) References Cited

U.S. PATENT DOCUMENTS

| 4,171,416 | A | * | 10/1979 | Motegi et al. ................ 526/245 |
| 6,642,337 | B1 | * | 11/2003 | Misiak et al. ................ 526/298 |
| 7,118,013 | B2 | * | 10/2006 | Wakatsuki et al. .......... 222/386 |
| 2003/0135016 | A1 | | 7/2003 | Tajima et al. |
| 2003/0162857 | A1 | * | 8/2003 | Wojciak et al. ................ 522/7 |
| 2006/0062687 | A1 | * | 3/2006 | Morales ......................... 422/1 |

FOREIGN PATENT DOCUMENTS

EP 0 323 720 A 7/2003

OTHER PUBLICATIONS

Torao Higaki, "Kobunshi Tenkazai Kaishitsuzai no Hyoka to Shijo", Kabushiki Kaisha CMC, 29, June 1984, p. 14.

* cited by examiner

*Primary Examiner*—Tae H Yoon
(74) *Attorney, Agent, or Firm*—Fitch, Even, Tabin & Flannery

(57) ABSTRACT

There is provided a 2-cyanoacrylate composition useful as cyanoacrylate adhesives that maintain a high speed of adhesion to poorly adherent materials and porous materials and have an improved light stability. The 2-cyanoacrylate composition contains a 2-cyanoacrylate, (1) a hindered phenol compound having a specific structure and (2) a compound having a clathrating ability.

14 Claims, No Drawings

2-CYANOACRYLATE COMPOSITION

This Application is the U.S. National Stage Application under 35 U.S.C. 371 of International Application PCT/JP/2006/310622 filed May 29, 2006 which claims benefit from Japanese patent application number 2005-156636 filed May 30, 2005, the complete disclosures of which are incorporated herein by reference.

TECHNICAL FIELD

The present invention relates to a 2-cyanoacrylate composition, particularly to a 2-cyanoacrylate composition that has an excellent adhesiveness to poorly adherent materials and porous materials and a good light stability, and the composition is useful especially as an instantaneous adhesive.

BACKGROUND ART

Cyanoacrylate adhesives which contain a 2-cyanoacrylate as a main ingredient are widely used as instantaneous adhesives in various industrial fields such as electronic, electric and automotive fields and in leisure and household applications since they are polymerized and hardened in a short time by anionic species such as moisture on an adherent surface or in the air thanks to their high anionic polymerizability, thereby bonding various materials to each other. However, they have been disadvantageous in that they are insufficient in speed of adhesion to poorly adherent materials such as polyacetals, FRPs, chrome platings and EPDM rubbers, and porous materials such as leathers, wood and paper.

As a method for solving the above problems, it has been proposed that crown ethers as described in Patent Document 1, polyethylene glycol derivatives as described in Patent Document 2 or the like should be incorporated as hardening accelerators in 2-cyanoacrylates. Thus, adhesive compositions having an adhesion speed high enough for the above materials have been obtained.

However, the adhesive compositions which contain such hardening accelerators are disadvantageous in that they are ease to thicken and gel when left at a window exposed to sunlight or under a fluorescent lamp for a long period.

As a result of investigating the cause, the present inventors have presumed that the following phenomenon occurs. Hydroquinone is commonly used as a radical stabilizer in cyanoacrylate adhesives. When radicals are generated in the system by the action of light, hydroquinone may capture the radical to form a phenoxy radical. Since the phenoxy radical is unstable, it may abstract hydrogen from a crown ether or a polyethylene glycol. The resulting radical may react with oxygen in the system to generate a peroxide. Cleavage of the peroxide may induce radical chain reactions, thereby finally leading to radical polymerization of 2-cyanoacrylates.

On the other hand, an example using another radical stabilizer instead of hydroquinone is disclosed in Patent Document 3 in which a phenolic antioxidant is used. This avoids generation of benzoquinone which is toxic and medically undesirable, when a medical-grade 2-cyanoacrylate composition is irradiated with γ-ray for sterilization. This neither improves light stability in ordinary use, nor discloses that a hardening accelerator is used together.

Patent Document 1: Japanese Patent Laid-Open (Kokai) No. 53-129231
Patent Document 2: Japanese Patent Laid-Open (Kokai) No. 54-28342
Patent Document 3: Japanese Patent Laid-Open (Kokai) No. 7-252455

DISCLOSURE OF THE INVENTION

Problems to be Solved by the Invention

It is an object of the present invention to solve the above-mentioned problems, that is, to provide a 2-cyanoacrylate composition useful as cyanoacrylate adhesives, which maintain a high speed of adhesion to poorly adherent materials and porous materials, and have an improved light stability.

Means for Solving the Problems

As a result of intensive studies on methods for improving the light stability of the 2-cyanoacrylate composition, the present inventors have found that incorporation of a hindered phenol compound having a specific structure (hereinafter, referred to as "a specific hindered phenol compound") as a radical stabilizer can solve the problems. Thus, the present invention has the following constitution.

1) A 2-cyanoacrylate composition which comprises: a 2-cyanoacrylate;
(1) a hindered phenol compound represented by the following general formula (1):

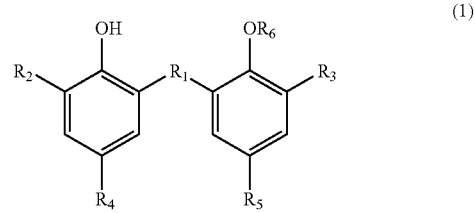

wherein $R_1$ is a linear or branched alkylene group having 1 to 4 carbon atoms; $R_2$ and $R_3$ are each independently a linear, branched or cyclic alkyl group having 1 to 10 carbon atoms; $R_4$ and $R_5$ are each independently a linear or branched alkyl group having 1 to 4 carbon atoms; and $R_6$ is a hydrogen atom, an alkyl group having 1 to 20 carbon atoms, an alkenyl group having 2 to 20 carbon atoms or an acyl group having 2 to 20 carbon atoms; and (2) a compound having a clathrating ability.

2) The 2-cyanoacrylate composition according to the above item 1), characterized in that the compound having a clathrating ability is a crown ether, a polyalkylene glycol or a derivative of these.

3) The 2-cyanoacrylate composition according to the above item 2), in which the compound having a clathrating ability is 15-crown-5.

4) The 2-cyanoacrylate composition according to any one of the above items 1) to 3), in which the hindered phenol compound is 2,2'-methylene-bis-(4-methyl-6-t-butylphenol).

Effect of the Invention

The 2-cyanoacrylate composition of the present invention has advantages of maintaining a high speed of adhesion to poorly adherent materials and porous materials and having a good light stability. This is presumably because radicals from the specific hindered phenol compound are more stable than phenoxy radicals generated from hydroquinone, and thus hardly cause hydrogen abstraction from crown ethers or polyethylene glycols.

BEST MODE FOR CARRYING OUT THE INVENTION

2-Cyanoacrylates used in the present invention include methyl-2-cyanoacrylate, ethyl-2-cyanoacrylate, propyl-2-cyanoacrylate, isopropyl-2-cyanoacrylate, butyl-2-cyanoacrylate, isobutyl-2-cyanoacrylate, amyl-2-cyanoacrylate, hexyl-2-cyanoacrylate, cyclohexyl-2-cyanoacrylate, octyl-2-cyanoacrylate, 2-ethylhexyl-2-cyanoacrylate, allyl-2-cyanoacrylate, benzyl-2-cyanoacrylate, methoxyethyl-2-cyanoacrylate, ethoxyethyl-2-cyanoacrylate, methoxypropyl-2-cyanoacrylate, tetrahydrofurfuryl-2-cyanoacrylate, and the like. These 2-cyanoacrylates may be used not only singly but also as a mixture of two or more.

Among them, methyl-2-cyanoacrylate, ethyl-2-cyanoacrylate and isopropyl-2-cyanoacrylate are preferable ones for making cyanoacrylate adhesives.

The specific hindered phenol compound used in the present invention is represented by the above general formula (1).

As to $R_1$ of the general formula (1), the linear or branched alkylene groups having 1 to 4 carbon atoms include methylene, ethylene, ethylidene, propylene, butylidnen, butylene, and the like; $R_1$ is preferably methylene.

As to $R_2$ and $R_3$ of the general formula (1), the linear, branched or cyclic alkyl groups having 1 to 10 carbon atoms include methyl, ethyl, n-propyl, t-butyl, t-pentyl, cyclohexyl, methylcyclohexyl, and the like; $R_2$ and $R_3$ are each preferably a t-butyl group.

As to $R_4$ and $R_5$ of the general formula (1), the linear or branched alkyl groups having 1 to 4 carbon atoms include methyl, ethyl, n-propyl, t-butyl, and the like; $R_4$ and $R_5$ are each preferably a methyl group.

As to $R_6$ of the general formula (1), the alkyl groups having 1 to 20 carbon atoms include methyl, ethyl, n-propyl, n-butyl, n-pentyl, n-hexyl, n-heptyl, n-octyl n-nonyl, and the like; the alkenyl groups having 2 to 20 carbon atoms include vinyl, allyl, acryl, and the like; the acyl groups having 2 to 20 carbon atoms include acetyl, benzoyl, and the like; $R_6$ is preferably a hydrogen atom.

Specific examples of the specific hindered phenol compound used in the present invention include, for example, 2,2'-methylene-bis-(4-methyl-6-t-butylphenol), 2,2'-methylene-bis-(4-ethyl-6-t-butylphenol), 2,2'-methylene-bis-(4-methyl-6-cyclohexylphenol), 2,2'-methylene-bis-(6-1-methylcyclohexyl)-p-cresol, 2,2'-ethylidene-bis-(2,4-methyl-6-t-butylphenol), 2,2'-butylidene-bis-(2-t-butyl-4-methylphenol), 2-t-butyl-6-(3'-t-butyl-5'-methyl-2'-hydroxybenzyl)-4-methylphenyl acrylate, and the like. These specific hindered phenol compounds may be used singly or as a mixture of two or more. Among them, 2,2'-methylene-bis-(4-methyl-6-t-butylphenol), 2,2'-methylene-bis-(4-ethyl-6-t-butylphenol), 2,2'-methylene-bis-(4-methyl-6-cyclohexylphenol) and 2-t-butyl-6-(3'-t-butyl-5'-methyl-2'-hydroxybenzyl)-4-methylphenyl acrylate are preferable because these have an excellent light stabilizing property in 2-cyanoacrylate compositions; 2,2'-methylene-bis-(4-methyl-6-t-butylphenol) is further preferable.

Hydroquinone, hydroquinone monomethyl ether, catechol, pyrogallol or the like, which has been conventionally used as a radical polymerization inhibitor, may be used together.

The amount of the specific hindered phenol compound used in the present invention is preferably 100 to 10,000 ppm by mass, further preferably 500 to 5,000 ppm by mass relative to the 2-cyanoacrylate. When the amount is less than 100 ppm by mass, sufficient light stability cannot be obtained; and when the amount exceeds 10,000 ppm by mass, curing rate may be lowered.

The compound having a clathrating ability includes polyalkylene oxides, crown ethers, silacrown ethers, Calixarenes, cyclodextrins, pyrogallolic cyclic compounds, or the like. Crown ethers, polyalkylene glycols or derivatives of these are preferable because these have an excellent hardening acceleration effect. Among the polyalkylene glycols, polyethylene glycols are preferable. Specifically, crown ethers include, for example, 18-crown-6, 15-crown-5, 12-crown-4, benzo-18-crown-6, dibenzo-18-crown-6, dicyclohexano-24-crown-8, 2-hydroxymethyl-18-crown-6, benzo-15-crown-5, and the like. Polyethylene glycols and their derivatives include, for example, polyethylene glycols, polyethylene glycol monoacrylates, polyethylene glycol diacrylates, polyethylene glycol monomethacrylates, polyethylene glycol dimethacrylates, monomethoxy polyethylene glycol monomethacrylates, dimethoxy polyethylene glycols, and the like. Among these compounds having a clathrating ability, 12-crown-4, 15-crown-5 and 18-crown-6 are preferable because these have a great hardening acceleration effect; 15-crown-5 is further preferable. These compounds having a clathrating ability may be used singly or as a mixture of two or more.

The amount of the compound having a clathrating ability is preferably 50 ppm by mass to 5.0% by mass, further preferably 100 ppm by mass to 2.0% by mass relative to the 2-cyanoacrylate. When the amount is less than 50 ppm by mass, a sufficient speed of adhesion to poorly adherent materials and porous materials cannot be obtained. When the amount exceeds 5.0% by mass, storage stability may be remarkably deteriorated.

The 2-cyanoacrylate composition of the present invention may be supplemented, for the purpose of improving the storage stability, with an anionic polymerization inhibitor such as sulfur dioxide, p-toluenesulfonic acid, methanesulfonic acid, propanesultone and a boron trifluoride complex in an arbitrary amount. Further, according to the purpose, a thickener, plasticizer, thixotropic agent, adhesion promoter, crosslinking agent, dye, perfume or the like may be added.

EXAMPLES

Hereinafter, the present invention will be further described in detail by way of examples and comparative examples, but the present invention is not limited thereto. Evaluation method for light stability was as follows: a polyethylene vessel was charged with 2 g of an adhesive composition obtained in each of the examples and comparative examples, which was then irradiated with a solar light lamp (Daiwa Lighting Corporation; Sun Ream Light TDL-150) at an illuminance of 0.2 mW/cm$^2$ (405 nm) under a temperature of 23° C. and a humidity of 50%. The number of days until gelation occurred was counted. Speed of adhesion to acid paper was measured according to JIS-K-6861. Herein, three drops of an adhesive sample were dropped on acid paper of 0.3 mm in thickness as a test piece; a second test piece was bonded thereto whilst stood upright; and the time required till the second test piece came not to fall was measured with a stopwatch.

Examples 1 to 10 and Comparative Examples 1 to 12

To ethyl-2-cyanoacrylate, were added 20 ppm by weight of sulfur dioxide as an anionic polymerization inhibitor, and a hindered phenol compound and a compound having a clathrating ability which were compounds shown in Table 1 or 2 together with addition amounts thereof, to prepare each adhesive composition. The results of the evaluation described above are shown in Tables 1 and 2. A to D in the Tables denote as follows.

A: 15-crown-5
B: 12-crown-4
C: monomethacrylate of polyethylene glycol (400) monoethyl ether
D: polyethylene glycol (1,000) dimethacrylate Examples 11 to 15

Adhesive compositions were prepared under the same conditions as in Example 1, except that the addition amounts of the compounds A to D having a clathrating ability were all 1,000 ppm. The results of adhesion tests described before are shown in Table 3.

TABLE 1

|  | Hindered phenol compound or hydroquinone | Content (ppm by mass) of the hindered phenol compound or hydroquinone | Compound having clathrating ability | Content (ppm by mass) of the compound having clathrating ability | Light stability (gelling days) | Adhesion speed (sec) |
|---|---|---|---|---|---|---|
| Ex. 1 | 2,2'-methylene-bis-(4-methyl-6-t-butylphenol) | 780 | A | 1000 | 12 | 15 |
| Ex. 2 | same as above | 3100 | A | 1000 | 27 | 15 |
| Ex. 3 | 2-t-butyl-6-(3'-t-butyl-5'-methyl-2'-hydroxybenzyl)-4-methylphenyl acrylate | 3600 | A | 1000 | 22 | 15 |
| Ex. 4 | 2,2'-methylene-bis-(4-ethyl-6-t-butylphenol) | 840 | A | 1000 | 8 | 15 |
| Ex. 5 | 2,2'-methylene-bis-(4-methyl-6-cyclohexylphenol) | 3500 | A | 1000 | 8 | 15 |
| Ex. 6 | 2,2'-methylene-bis-(4-methyl-6-t-butylphenol) | 780 | B | 5000 | 13 | 10 |
| Ex. 7 | same as above | 780 | C | 5000 | 17 | 45 |
| Ex. 8 | same as above | 780 | D | 5000 | 16 | 15 |

Note:
"Ex." means Example.

TABLE 2

|  | Hindered phenol compound or hydroquinone | Content (ppm by mass) of the hindered phenol compound or hydroquinone | Compound having clathrating ability | Content (ppm by mass) of the compound having clathrating ability | Light stability (gelling days) | Adhesion speed (sec) |
|---|---|---|---|---|---|---|
| Comp. Ex. 1 | Hydroquinone | 500 | A | 1000 | 3 | 15 |
| Comp. Ex. 2 | Hydroquinone | 500 | B | 5000 | 4 | 10 |
| Comp. Ex. 3 | Hydroquinone | 500 | C | 5000 | 5 | 45 |
| Comp. Ex. 4 | Hydroquinone | 500 | D | 5000 | 5 | 15 |
| Comp. Ex. 5 | 2,6-di-t-butyl-4-methylphenol | 1000 | A | 1000 | 3 | 15 |
| Comp. Ex. 6 | Tetrakis-[methylene-3-(3',5'-di-t-butyl-4'-hydroxyphenyl)propionate]-methane | 1300 | A | 1000 | 2 | 15 |
| Comp. Ex. 7 | 4,4'-butylidene-bis-(3-methyl-6-t-butylphenol) | 780 | A | 1000 | 2 | 15 |
| Comp. Ex. 8 | 4,4'-methylene-bis-(2,6-di-t-butylphenol) | 960 | A | 1000 | 2 | 15 |
| Comp. Ex. 9 | 2,2'-methylene-bis-(4-methylphenol) | 1000 | A | 1000 | 2 | 15 |
| Comp. Ex. 10 | Hydroquinone | 500 | none |  | 8 | 120 or more |
| Comp. Ex. 11 | 2,2'-methylene-bis-(4-methyl-6-t-butylphenol) | 780 | none |  | 25 | 120 or more |
| Comp. Ex. 12 | none |  | A | 1000 | 1 | 15 |
| Ex. 9 | 2,2'-methylene-bis-(4-methyl-6-t-butylphenol) | 50 | A | 1000 | 3 | 15 |
| Ex. 10 | same as above | 12000 | A | 1000 | 50 | 120 |

Note:
"Comp. Ex." means Comparative Example, and "Ex." means Example.

TABLE 3

|  | Hindered phenol compound | Content (ppm by mass) of the hindered phenol compound | Compound having clathrating ability | Content (ppm by mass) of the compound having clathrating ability | Adhesion speed (sec)) |
|---|---|---|---|---|---|
| Ex. 11 | 2,2'-methylene-bis-(4-methyl-6-t-butylphenol) | 780 | A | 1000 | 15 |
| Ex. 12 | same as above | same as above | B | 1000 | 20 |
| Ex. 13 | same as above | same as above | C | 1000 | 120 |
| Ex. 14 | same as above | same as above | D | 1000 | 45 |

As is clear from Table 2, the adhesive compositions containing hydroquinone as a radical stabilizer exhibit an improved adhesiveness but become poor in light stability, when the compositions contain a compound having a clathrating ability together (Comparative Examples 1 to 4 and 10).

When the adhesive compositions contain, instead of hydroquinone, compounds other than the specific hindered phenol compounds of the present invention, namely, when hindered phenol compounds having one aromatic ring such as 2,6'-di-t-butyl-4-methylphenol are used (Comparative Examples 5 and 6), when hindered phenol compounds in which two aromatic rings are bonded together at para-positions relative to the phenolic hydroxyl groups thereof are used (Comparative Examples 7 and 8), and also when a compound in which non-hindered phenolic hydroxyl-containing aromatic rings are bonded together at ortho-positions relative to the hydroxyl groups thereof are used (Comparative Example 9), light stability is not improved.

By contrast, when the specific hindered phenol compounds of the present invention are used (Examples 1 to 8), light stability is greatly improved.

However, when the concentration of the specific hindered phenol compound is less than 100 ppm by weight, a sufficient light stability cannot be obtained (Example 9); and when the concentration of the specific hindered phenol compound exceeds 10,000 ppm by weight, a good light stability is obtained, but adhesiveness was lowered (Example 10).

The present invention has been described in detail referring to specified embodiments, but it will be obvious to those skilled in the art that various changes and modifications may be made without departing from the spirit and the scope of the present invention.

The present application is based on a Japanese Patent Application (Japanese Patent Application No. 2005-156636) filed on May 30, 2005, the content of which is incorporated herein by reference.

INDUSTRIAL APPLICABILITY

Since the 2-cyanoacrylate compositions provided by the present invention have an excellent adhesiveness to poorly adherent materials and porous materials, and have a good light stability, they can be used as instantaneous adhesives and fillers having adhesiveness and storage stability that have not conventionally been available.

The invention claimed is:

1. An anionically polymerizable 2-cyanoacrylate composition comprising:
    a 2-cyanoacrylate;
    (1) a hindered phenol compound selected from the group consisting of 2,2'-methylene-bis-(4-methyl-6-t-butylphenol), 2,2'-methylene-bis-(4-ethyl-6-t-butylphenol), 2,2'-methylene-bis-(4-methyl-6-cyclohexylphenol), 2,2'-methylene-bis-(6-1-methylcyclohexyl)-p-cresol, 2,2'-ethylidene-bis-(2,4-methyl-6-t-butylphenol), 2,2'-butylidene-bis-(2-t-butyl-4-methylphenol), and 2-t-butyl-6-(3'-t-butyl-5'-methyl-2'-hydroxybenzyl)-4-methylphenyl acrylate

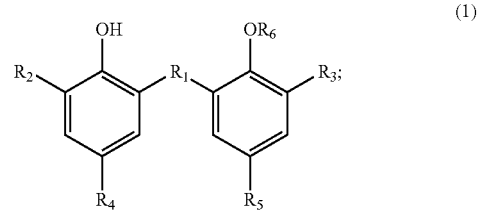

and
    (2) at least one compound having a clathrating ability selected from the group consisting of 15-Crown-5-ether and 12-Crown-4-ether,
    wherein said composition contains said hindered phenol compound in an amount of 100 to 10,000 ppm by mass relative to the 2-cyanoacrylate.

2. The 2-cyanoacrylate composition according to claim 1, in which the compound having a clathrating ability is 15-crown-5-ether.

3. The 2-cyanoacrylate composition according to claim 1, in which the hindered phenol compound is 2,2'-methylene-bis-(4-methyl-6-t-butylphenol).

4. The anionically polymerizable 2-cyanoacrylate composition according to claim 1, wherein said composition contains said hindered phenol compound in an amount of 780 to 3500 ppm by mass relative to the 2-cyanoacrylate.

5. The anionically polymerizable 2-cyanoacrylate composition according to claim 1, wherein said composition contains said hindered phenol compound in an amount of 500 to 5,000 ppm by mass relative to the 2-cyanoacrylate.

6. The anionically polymerizable 2-cyanoacrylate composition according to claim 1, wherein said composition contains said component (2) in an amount of 50 ppm by mass to 5.0% by mass relative to the 2-cyanoacrylate.

7. The anionically polymerizable 2-cyanoacrylate composition according to claim 1, wherein said composition contains said component (2) in an amount of 100 ppm by mass to 2.0% by mass relative to the 2-cyanoacrylate.

8. The anionically polymerizable 2-cyanoacrylate composition according to claim 1, wherein said hindered phenol compound is 2,2'-methylene-bis-(4-methyl-6-t-butyl(phenol)) and said compound having clathrating ability is 15-crown-5-ether.

9. The anionically polymerizable 2-cyanoacrylate composition according to claim 1, wherein said composition contains said component (2) in an amount of 1000 ppm by mass to 5000 ppm by mass relative to the 2-cyanoacrylate.

10. An anionically polymerizable 2-cyanoacrylate composition which consists essentially of:
(a) a 2-cyanoacrylate;
(b) a hindered phenol compound selected from the group consisting of 2,2'-methylene-bis-(4-methyl-6-t-butylphenol), 2,2'-methylene-bis-(4-ethyl-6-t-butylphenol), 2,2'-methylene-bis-(4-methyl-6-cyclohexylphenol), 2,2'-methylene-bis-(6-1-methylcyclohexyl)-p-cresol, 2,2'-ethylidene-bis-(2,4-methyl-6-t-butylphenol), 2,2'-butylidene-bis-(2-t-butyl-4methylphenol), and 2-t-butyl-6-(3'-t-butyl-5'-methyl-2'-hydroxybenzyl)-4-methylphenyl acrylate

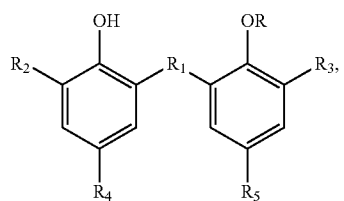

(1)

wherein said composition contains said hindered phenol compound in an amount of 100 to 10,000 ppm by mass relative to the 2-cyanoacrylate;

(c) at least one compound having a clathrating ability selected from the group consisting of 15-crown-5-ether and 12-crown-4-ether, wherein said composition contains said component (c) in an amount of 50 ppm by mass to 5.0% by mass relative to the 2-cyanoacrylate; and
(d) optionally, at least one selected from the group consisting of anionic polymerization inhibitors, thickeners, plasticizers, thixotropic agents, adhesion promoters, crosslinking agents, dyes, and perfumes.

11. The anionically polymerizable 2-cyanoacrylate composition according to claim 10, wherein said hindered phenol compound is 2,2'-methylene-bis-(4-methyl-6-t-butyl(phenol) and said compound having clathrating ability is 15-crown-5-ether.

12. The anionically polymerizable 2-cyanoacrylate composition according to claim 10, wherein said composition contains said hindered phenol compound in an amount of 780 to 3500 ppm by mass relative to the 2-cyanoacrylate.

13. The anionically polymerizable 2-cyanoacrylate composition according to claim 10, wherein said composition contains said hindered phenol compound in an amount of 500 to 5,000 ppm by mass relative to the 2-cyanoacrylate.

14. The anionically polymerizable 2-cyanoacrylate composition according to claim 10, wherein said composition contains said component (c) in an amount of 100 ppm by mass to 2.0% by mass relative to the 2-cyanoacrylate.

* * * * *